United States Patent

[11] 3,621,052

| [72] | Inventor | Kurt Thiele<br>Frankfurt am Main, Germany |
|---|---|---|
| [21] | Appl. No. | 749,555 |
| [22] | Filed | July 1, 1968 |
| [45] | Patented | Nov. 16, 1971 |
| [73] | Assignee | Deutsche Gold- und Silber-Scheideanstalt<br>vormals Roessler<br>Frankfurt am Main, Germany |
| [32] | Priority | June 29, 1967 |
| [33] |  | Germany |
| [31] |  | P 15 93 836.0 |

[54] N-PROPIOPHENONE-NOREPHEDRINES AND SALTS THEREOF
6 Claims, No Drawings

[52] U.S. Cl. ..................................................... 260/570.5 C,
260/501.18, 260/567.6 M, 424/330
[51] Int. Cl. ............................................................ C07c 95/08
[50] Field of Search ............................................. 260/501.18,
570.5 C

[56] References Cited
UNITED STATES PATENTS

| 3,197,507 | 7/1965 | Freed et al. | 260/570.5 |
| 3,225,095 | 12/1965 | Thiel | 260/570.5 |
| 3,337,546 | 8/1967 | Malatestinie et al. | 260/570.5 X |
| 3,337,626 | 8/1967 | Thiele | 260/570.5 |

Primary Examiner—Robert V. Hines
Attorney—Stephens, Huettig & O'Connell

ABSTRACT: Amino ketones of the formula

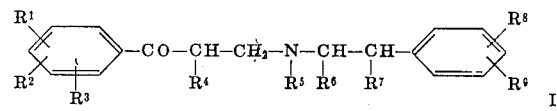

wherein:
$R^1$ is selected from the group consisting of —Br, lower alkyl, —$NH_2$ and trifluoromethyl;
$R^2$ and $R^3$ are selected from the group consisting of —H, —Cl, —Br, lower alkyl, —OH and lower alkoxy;
$R^4$ is —H, methyl or ethyl;
$R^5$ is —H or lower alkyl;
$R^6$ is —H or methyl;
$R^7$ is —H or —OH and
at least one of $R^8$ and $R^9$ is —OH and the other is —H, —OH, halogen, lower alkyl or lower alkoxy and certain amino ketones of said formula wherein $R^4$, $R^5$, $R^8$ and $R^9$ are —H, $R^6$ is methyl and $R^7$ is —OH and their pharmacologically acceptable acid addition salts and quaternary ammonium salts, such compounds having pharmaceutical activity in improving the heart function.

N-PROPIOPHENONE-NOREPHEDRINES AND SALTS THEREOF

BACKGROUND OF THE INVENTION

Compounds of the formula

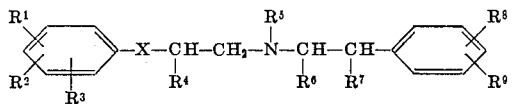

wherein:
X is —CO— or —CH(OH)—;
each of $R^1$, $R^2$ and $R^3$ is —H, —Cl, —$NO_2$, —OH or —$OCH_3$;
$R^4$ is —H, —$CH_3$ or —$C_2H_5$;
each of $R^5$ and $R^6$ is —H or —$CH_3$ and
each of $R^8$ and $R^9$ is —H, —Cl, —$CH_3$ or $OCH_3$
which are suited for improvement of the heart function have been described in U.S. Pat. No. 3,225,095.

DESCRIPTION OF THE INVENTION INCLUDING PREFERRED EMBODIMENTS

According to the invention, it was found that compounds of the following formula, as well as their pharmacologically acceptable acid addition and quaternary ammonium salts

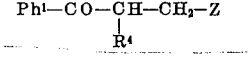

wherein:
$R^1$ is selected from the group consisting of —Br, lower alkyl, —$NH_2$ and trifluoromethyl;
$R^2$ and $R^3$ are selected from the group consisting of —H, —Cl, —Br, lower alkyl, —OH and lower alkoxy;
$R^4$ is —H, methyl or ethyl;
$R^5$ is —H or lower alkyl;
$R^6$ is —H or methyl;
$R^7$ is —H or —OH and
at least one of $R^8$ and $R^9$ is —OH and the other is —H, —OH, halogen, lower alkyl or lower alkoxy as well as certain compounds of such a formula wherein $R^4$, $R^5$, $R^8$ and $R^9$ are hydrogen, $R^6$ is methyl and $R^7$ is —OH also possess valuable properties in improving the heart function.

For sake of simplicity in the following general description of the process for preparing the compounds according to the invention, the radical

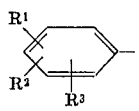

which also appears at the left end of the formula I for the compounds according to the invention will be designated as $Ph^1$— and the radical

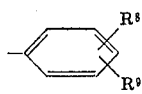

which also appears at the right end of such formula will be designated as —$Ph^2$.

The compounds according to the invention, for example, can be produced by:

a. reacting a compound of the formula

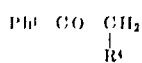

with a compound of the formula $$H-N-CH-CH-Ph^2$$
$$\phantom{H-N}R^5\phantom{-}R^6\phantom{-}R^7 \quad\quad IV$$

together with formaldehyde or a formaldehyde-yielding substance;

b. reacting a compound of the formula $$Ph^1-CO-CH-CH_2-Z$$
$$\phantom{Ph^1-CO-}R^4 \quad\quad V$$

with a compound of the formula $$W-CH-CH-Ph^2$$
$$\phantom{W-}R^6\phantom{-}R^7 \quad\quad VI$$

in which one of Z and W represents halogen and the other —$NHR^5$, in the presence of a basic substance;

c. reacting a compound of the formula $$Ph^1-CH-C=CH_2$$
$$\phantom{Ph^1-CH-}R^4 \quad\quad VII$$

or the corresponding Mannich base

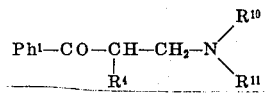

wherein $R^{10}$ and $R^{11}$ are lower alkyl with a compound of the formula IV;

d. reacting a compound of the formula $Ph^1$—Me in which Me is alkali metal, —MgCl, —MgBr or —MgI with a compound of the formula $$V-CH-CH_2-N-CH-CH-Ph^2$$
$$\phantom{V-}R^4\phantom{-CH_2-}R^5\phantom{-}R^6\phantom{-}R^7 \quad\quad X$$

in which V is —CN or —COHal (Hal=Cl or Br);

e. hydrogenating a compound of formula II in which $R^1$ is a nitro group so as to reduce this nitro group selectively to the amino group.

In methods a–d, in the event $R^1$ is an amino group, the amino group in the starting compound employed is first benzylated, or acylated with an aromatic or aliphatic carboxylic acid or with a carbobenzoxy acid. These protective groups are then subsequently split off by known methods. The deacylation of the acylated amino group is preferably carried out in an acid medium, for instance, alcohol/water/acid at temperatures between 80° and 140° C. The benzyl radical and the carbobenzoxy radicals can, for example, be removed by catalytic hydrogenation with palladium catalysts at low temperatures.

In procedure (a) temperatures of 20° to 150° C. are usually employed. Solvents such as alcohols, dioxane, glacial acetic acid and the like come into consideration.

Procedure (b) is usually carried out at elevated temperatures, such as, for example, between 80° and 140° C., in a solvent such as an alcohol, ether, dimethyl formamide and the like. Alkali metal alcoholates, alkali metal amides, alkali metal carbonates and tertiary amines, for instance, come into consideration as the basic substances.

Procedure (c) when carried out with unsaturated ketone VII is generally carried out at temperatures between 20° and 80° C. in an inert solvent, such as, ether, acetone, dioxane or chloroform and when carried out with the corresponding Mannich base VIII, which during the reaction intermediately decomposes to the unsaturated ketone VII is generally carried out at 30° to 120° C. in a solvent such as water, alcohol/water or a two-phase system such as water/benzene or water/toluene.

Procedure (d) is preferably carried out at temperatures between —20° and +80° C. Solvents, such as, ether, dioxane, tetrahydrofurane or benzene come into question.

The selective reduction of the nitro group in procedure (e) is carried out by known methods, for example, by hydrogenation in the present of a usual hydrogenation catalyst, such as, palladium, platinum oxide, Raney-nickel, in a solvent, such as, alcohol, preferably at normal pressure at temperatures between 20° and 50° C. or by reduction with nascent hydrogen, for example, reduction with Zn/Hcl, Sn/Hcl, Fe/Hcl, activated Al in water containing ether or by reduction with salts of $H^2S$ in alcohol/water or reduction with $SnCl_2HCl$ The compounds according to the invention which contain optically active carbon atoms which usually are obtained as racemates can be separated into their optically active isomers or diastereomers by the normal methods. However, optically active isomers or diastereomers can also be used as starting materials.

The compounds according to the invention can be converted to their pharmacologically acceptable acid addition salts or quaternary ammonium salts with the aid of such pharmacologically acceptable acids such as acetic, succinic, maleic, fumaric, lactic, hydrochloric, hydrobromic, sulfuric, phosphoric acids or quaternizing compounds such as the lower alkyl halides.

Conversely, when the acid salts are produced as primary products, they may be converted to their free base by treatment with a base such as potassium carbonate.

The compounds according to the invention possess valuable pharmaceutical properties and are suited for the treatment of heart and circulatory conditions and especially for increasing the coronary blood flow in combination with an improvement in the heart function. The compounds were tested on the isolated guinea pig heart following the method of Langendorff (Pfluger's Arch. 61, 219, 1889) for their activity on coronary blood flow, contraction amplitude and heart frequency. Metabolism investigations on the Langendorff heart have also shown that the increase in contraction amplitude is accompanied by an increased production of energy supplying substrates and improved utilization of the latter. Their toxicity LD 50 mg./kg. was tested on mice upon oral application by the method of Miller and Tainter (Proc. Soc. exper. Biol. a. Med. 57, 261, 1944).

The compounds according to the invention produce a moderate to strong dilation of the coronary system with a simultaneous increase in contraction amplitude in a dosage range of 10–500 µg./heart. They therefore are suited for improving the function of the heart muscle, as well as the blood flow through the heart muscle.

The administration of the compounds according to the invention is by the standard modes for administration of compounds which are active in improving coronary blood circulation, such as, for example, enteral, parenteral, oral or perlingual. The dosage rate upon intravenous administration to animals, for example, dogs, is in the range of about 0.5–50 mg./kg.

The following examples will serve to illustrate the compounds according to the invention.

Example 1

1-3-[1-phenyl-1-hydroxy-propyl-(2)-amino]-1-(2,4-dimethyl-phenyl)-propanone-(1)·HCl

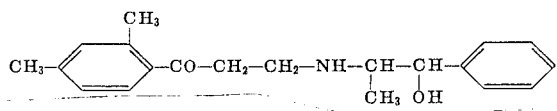

35.5 g. (0.24 mol) of 2,4-dimethyl acetophenone, 30.2 g. (0.2 mol) of 1-norephedrine and 7.2 g. (0.24 mol) of paraformaldehyde were added to 80 ml. of isopropanol and the mixture adjusted to a pH of 5 by addition of 36 ml. of isopropanolic HCl. The mixture was then boiled under reflux for 3 hours whereupon the hydrochloride precipitated out. Yield of HCl salt 37 g., melting point 214°–216° C. (recrystallized from methanol).

Example 2

1-3-[1-phenyl-1-hydroxy-propyl-(2)-amino]-1-(2,3-dimethyl-phenyl)-propanone-(1)·HCl 35.5 g. (0.24mol) of 2,5-dimethyl acetophenone were reacted as described in example 1 with 1-norephedrine and paraformaldehyde. Yield of HCl salt 36 g., melting point 179°–181° C. (recrystallized from ethanol).

Example 3

1-3-[1-phenyl-1-hydroxy-propyl-(2)-amino]-1-(3,4-dimethyl-phenyl)-propanone-(1)·HCl 35.5 g. (0.24 mol) of 3,4-dimethyl acetophenone were reacted as describe in example 1 with 1-norephedrine and paraformaldehyde. Yield of HCl salt 46 g., melting point 204°–205° C. (recrystallized from methanol).

Example 4

1-3-[1-phenyl-1-hydroxy-propyl-(2)-amino]-1-(4-bromo-phenyl)-propanone-(1)·HCl 21.9 g. (0.11 mol) of 4-bromo acetophenone, 15.1 g. (0.1 mol) of 1-norephedrine and 3.6 g. (0.12 mol) of paraformaldehyde were added to 60 ml. of isopropanol and the mixture adjusted to a pH of 4 with 25 ml. of isopropanolic HCl The mixture was then boiled under reflux for 2 hours whereupon the hydrochloride precipitated out. Yield of HCl salt 13 g. melting point 203°–205° C. (recrystallized from methanol).

Example 5

1-3-[1-phenyl-1-hydroxy-propyl-(2)-amino]-1-(3-bromo-phenyl)-propanone-(1)·HCl 21.9 g. of 3bromo acetophenone were reacted as described in example 4 with 1-norephedrine and paraformaldehyde. Yield of HCl salt 14 g. melting point 211°–210° C. (recrystalized from methanol).

Example 6

1-3-[1-phenyl-1-hydroxy-propyl-(2)-amino]-1-(3-trifluoromethyl-phenyl)-propanone-(1)·HCl 25 g. (0.133 mol) of 3-trifluoromethyl acetophenone, 25 g. (0.133 mol) of 1-norephedrine·HCl and 8 g. (0.267 mol) of paraformaldehyde were boiled under reflux for 2 hours in 150 ml. of isopropanol. Upon cooling down the HCl salt precipitated out. Yield of HCl salt 17 g. melting point 217°–219 C. (recrystallized from methanol).

Example 7

1-3-[1-phenyl-1-hydroxy-propyl-(2)-amino]-1-(3-amino-phenyl)-propanone-(1)·HCl 9 g. (0.0247 mol) of 1-3-[1-phenyl-l-1-hydroxy-propyl-(2)-amino]-1-(3-nitro-phenyl)-propanone-(1)·HCl (prepared by method (a); U.S. Pat. No. 3,225,095) were hydrogenated in 75 ml. of methanol in the presence of 2.5 g. of palladium/barium sulfate (5 percent) whereupon the temperature rose to 40° C. The reduction was interrupted after 1.78 liters of hydrogen had been taken up, the catalyst filtered off and the solvent distilled off. Yield 4.5 g. of the monohydrochloride, melting point 162° C. (recrystallized from ethanol).

Example 8

1-3-[1-phenyl-1-hydroxy-propyl-(2)-amino]-1-(3-amino-4-hydroxy-phenyl)-propanone-(1)· 2HCl 15 g. (0.41 mol) of 1-3-[1-phenyl-1-hydroxy-propyl-(22)-amino]-1-(3-nitro-4-hydroxy-phenyl)-propanone-(1)·HCl (m.p. 204°–205° C. prepared by a method analogous to that for the nitro compound of example 7 were hydrogenated in 500 ml. of methanol in the presence of 1.5 g. of palladium/carbon (5 percent) at 50° C. The reduction was interrupted after 2.76 liters of hydrogen had been taken up, the catalyst filtered off, the filtrate acidified with isopropanolic HCl and the solvent distilled off. Yield 11 g. of the dihydrochloride, melting point 235°–236° C. (recrystallized from methanol).

Example 9

1-3-[1-phenyl-1-hydroxy-propyl-(2)-amino]-1-(2-hydroxy-5-methyl-phenyl)-propanone-(1)·HCl 32.4 g. of 2-hydroxy-5-methyl acetophenone, 6 g. of paraformaldehyde and 27.1 g. of 1-norephedrine adjusted to a pH of 3.5 with 115 ml. of isopropanolic HCl were boiled under reflux and processed as in example 6. After recrystallization from methanol the melting point of the HCl salt product was 219°–222° C.

Example 10 d,1-3-[1-(4-hydroxy-phenyl)-1-hydroxy-propyl-(2)-amino]-1-(3-methyl-phenyl)-propanone-(1)·HCl 15.4 g. (0.1 mol) of 3-methyl acetophenone, 3.9 g. (0.13 mol) of paraformaldehyde and 20.3 g. (0.1 mol) of d,1-p-hydroxy norephedrine·HCl were heated under reflux for 8 hours in 150 ml. of 2-butanol. The solvent was distilled off and the residue washed twice with ether, then dissolved in isopropanol and the HCl salt precipitated with ether. Yield 21 g. of the hydrochloride salt, melting point 73°–75° C.

EXAMPLE 11 d,1-3-[1-(4-hydroxy-phenyl)-1-hydroxy-propyl-(2)-amino]-1-(3-bromo-phenyl)-propanone-(1)·HCl 19.9 g. (0.1 mol) of 3-bromo acetophenone, 3.9 g. (0.13 mol) of paraformaldehyde and 20.3 g. (0.1 mol) of d,1-p-hydroxy norepherdrine·HCl were heated under reflux for 8 hours in 150 ml. of 2-butanol. The solvent was distilled off and the residue washed twice with 100 ml. of ether and twice with 100 ml. of water, then dissolved in acetone and the HCl salt precipitated with ether. Yield 6 g. of the HCl salt, melting point 80°–84° C.

EXAMPLE 12

1-3-[1-phenyl-1-hydroxy-propyl-(2)-amino]-1-(2-methoxy-5-methyl-phenyl)-propanone-(1)·HCl 13 g. (0.081 mol) of 2-methoxy-5-methyl acetophenone, 4.5 g. (0.15 mol) of paraformaldehyde and 15.2 g. (0.081 mol) of 1-norephedrineX·HCl were boiled under the reflux in 60 ml. of isopropanol for 4 hours. After the reaction solution cooled acetone and ether were added thereto, whereupon the HCl salt precipitated out. It was recrystallized from methyl ethyl ketone. Yield 9 g., melting point 155°–156° C.

I claim:

1. A compound selected from the group consisting of amino ketones of the formula

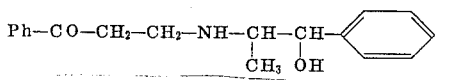

in which Ph is selected from the group consisting of

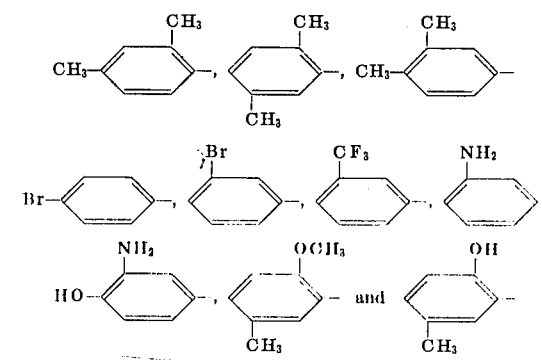

and their pharamacologically acceptable acid addition salts.

2. A compound according to claim 1 wherein Ph is

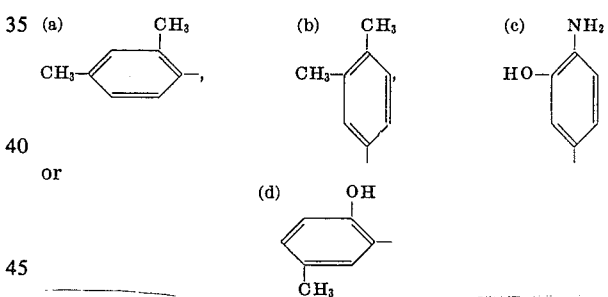

3. A compound according to claim 2 where Ph is (a).
4. A compound according to claim 2 where Ph is (b).
5. A compound according to claim 2 where Ph is (c).
6. A compound according to claim 2 where Ph is (d).

* * * * *